(12) United States Patent
Maldonado Cruz

(10) Patent No.: US 11,673,509 B2
(45) Date of Patent: Jun. 13, 2023

(54) BUILT-IN RECREATION DEVICE CARRIER

(71) Applicant: Rivian IP Holdings, LLC, Plymouth, MI (US)

(72) Inventor: Julio Cesar Maldonado Cruz, Canton, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 193 days.

(21) Appl. No.: 17/172,304

(22) Filed: Feb. 10, 2021

(65) Prior Publication Data

US 2022/0250550 A1 Aug. 11, 2022

(51) Int. Cl.
| *B60R 9/05* | (2006.01) |
| *B60R 9/10* | (2006.01) |
| *B60R 9/06* | (2006.01) |
| *B60R 9/04* | (2006.01) |
| *B60R 11/00* | (2006.01) |
| *B60J 7/00* | (2006.01) |
| *B60R 9/048* | (2006.01) |

(52) U.S. Cl.
CPC .............. *B60R 9/05* (2013.01); *B60J 7/0084* (2013.01); *B60R 9/10* (2013.01); *B60R 9/04* (2013.01); *B60R 9/048* (2013.01); *B60R 9/06* (2013.01); *B60R 11/00* (2013.01); *B60R 2011/0075* (2013.01)

(58) Field of Classification Search
CPC .... B60R 9/00; B60R 9/04; B60R 9/05; B60R 9/052; B60R 9/06; B60R 9/08; B60R 9/10; B60R 9/048; B60R 11/00; B60R 2011/004; B60R 2011/0047; B60R 2011/0075; B60P 7/00; B60P 7/06; B60P 7/08; B60P 7/0807; B60P 7/0815; B60P 7/0823; B60P 7/0084

USPC ....... 224/309, 316, 317, 324, 325, 328, 924; 296/37.7

See application file for complete search history.

(56) References Cited

U.S. PATENT DOCUMENTS

| 3,724,730 A | * | 4/1973 | Olsen | ........................ B60R 9/04 224/327 |
| 2012/0292950 A1 | * | 11/2012 | Stahlhut | .................... B60R 9/04 296/210 |
| 2017/0349113 A1 | * | 12/2017 | D'Angelo | ................. B60R 9/10 |
| 2018/0257581 A1 | * | 9/2018 | Maldonado Cruz | ...... B60R 9/06 |

FOREIGN PATENT DOCUMENTS

EP 1227028 A2 * 7/2002 ............... B60R 9/04

OTHER PUBLICATIONS

Dudek, "Modular Vehicle Roof", Published: Jul. 31, 2002, European Patent Office, Edition: EP-1227028-A2 (Year: 2002).*

* cited by examiner

*Primary Examiner* — Dennis H Pedder
*Assistant Examiner* — Joyce Eileen Hill
(74) *Attorney, Agent, or Firm* — Clements Bernard Walker; Christopher L. Bernard

(57) ABSTRACT

Various disclosed embodiments include illustrative vehicle roofs, vehicles, and bicycle carriers. In an illustrative embodiment, a vehicle roof includes a rooftop and a forward recess section. The forward recess section is disposed near a forward end of the rooftop. The forward recess section defines a first cavity. The forward recess section includes a recreational device mount disposed within the first cavity and a lid configured to aerodynamically cover the first cavity.

17 Claims, 3 Drawing Sheets

Front ⇐

BUILT-IN RECREATION DEVICE CARRIER

INTRODUCTION

The present disclosure relates to attachments on a vehicle for recreational devices. The statements in this section merely provide background information related to the present disclosure and may not constitute prior art.

Bicycle roof carriers are usually after market components that vehicle users have to buy and install in their vehicles. Sometimes these roof carriers are not compatible with the vehicle's roof system and additional purchases may have to be made in order to fit the vehicle to carry one or more bicycles in the roof.

BRIEF SUMMARY

Various disclosed embodiments include illustrative vehicle roofs, vehicles, and bicycle carriers.

In an illustrative embodiment, a vehicle roof includes a rooftop and a forward recess section. The forward recess section is disposed near a forward end of the rooftop. The forward recess section defines a first cavity. The forward recess section includes a recreational device mount disposed within the first cavity and a lid configured to aerodynamically cover the first cavity.

In another illustrative embodiment, a vehicle includes a cab, a roof configured to cover the cab, and a forward recess section disposed near a forward end of the rooftop. The forward recess section defines a first cavity. The forward recess section includes a recreational device mount disposed within the first cavity and a lid configured to aerodynamically cover the first cavity.

In another illustrative embodiment, a bicycle carrier includes a recess roof section, a lid, and a front fork mount. The recess roof section is located at a forward section of a rooftop. The recess roof section defines a cavity. The lid is configured to aerodynamically cover the recess roof section. The front fork mount is disposed within the recess roof section.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
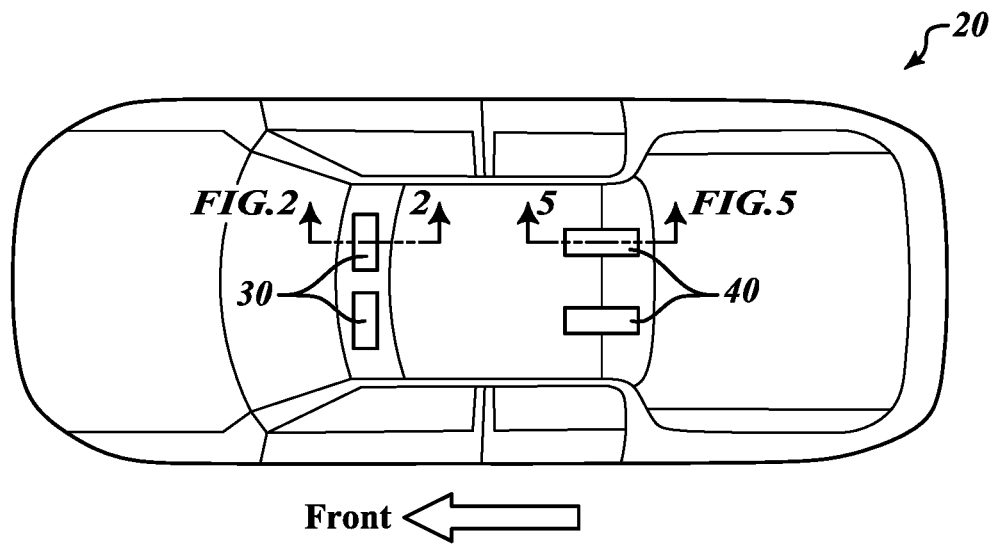
FIG. 1 is a top plan view of an illustrative vehicle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative vehicle roofs, vehicles, and bicycle carriers.

Referring now to FIG. 1 and given by way of overview, in various embodiments an illustrative vehicle 20 includes components for mounting a recreational device(s), such as bicycle or any wheeled vehicle that includes a wheel mounting fork. The vehicle 20 includes one or more forward mounting sections 30 located at a forward end of a roof of the vehicle 20. The mounting sections 30 are incorporated into roofs of various configurations.

In various embodiments, the vehicle 20 includes aft mounting sections 40. The aft mounting sections 40 may be incorporated into the roof of the vehicle 20, similar to the forward mounting sections 30, or may be an add-on device that attaches to the roof of the vehicle 20, such as suction devices, a device that attaches to side-mounted crossbars, or the like.

Figure 2:
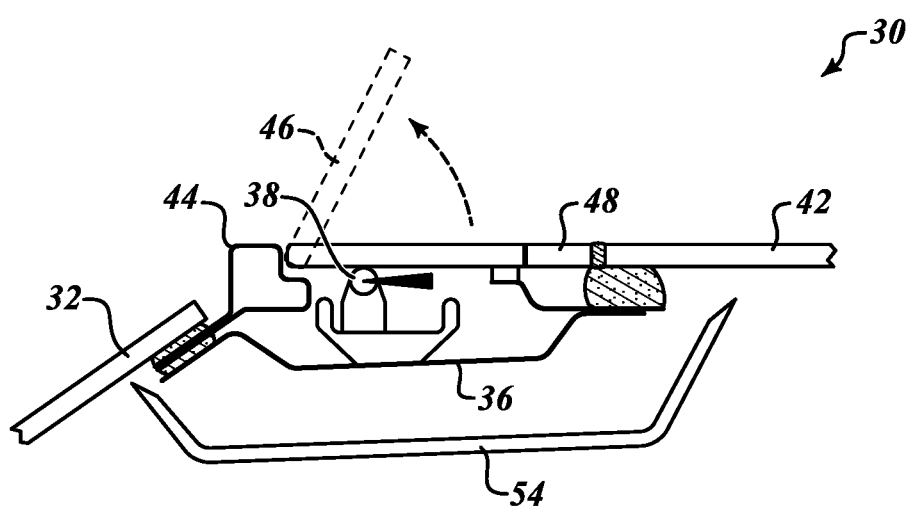
FIG. 2 is a cross-sectional view of an illustrative roof mounting system used on the vehicle of FIG. 1.
Figure 3:
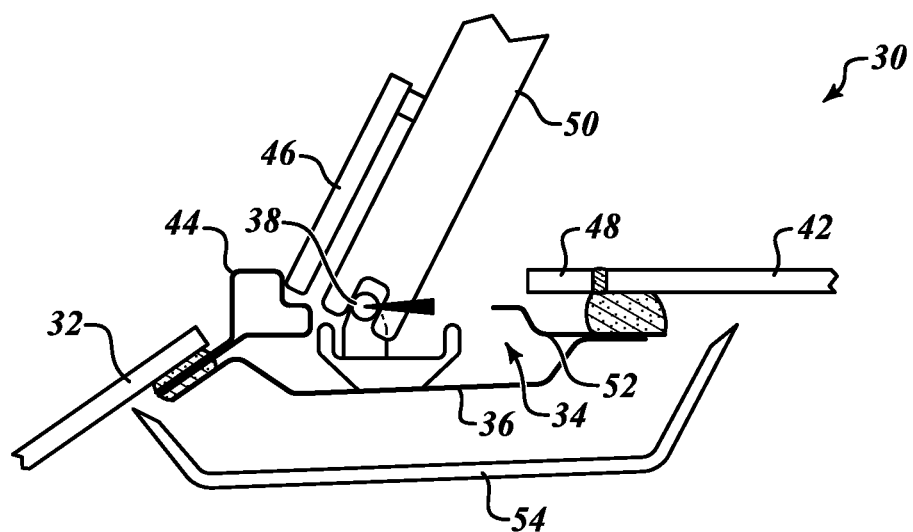
FIG. 3 is a cross-sectional view of a roof mounting system of FIG. 2.

Referring additionally to FIGS. 2 and 3, in various embodiments the forward mounting section 30 includes a cavity 34 formed within a forward section of a roof over a cab of the vehicle 20 between a windshield 32 and a glass roof 42. The cavity 34 is defined by a forward roof section 44 and a surrounding roof section 48. The forward roof section 44 and the surrounding roof section 48 may be molded, stamped, or machined from a singular material, for example stainless steel or the like. The cavity 34 has a predefined depth below top surfaces of the roof sections 44 and 48 and the glass roof 42. An interior ceiling liner 54 is located under the cavity 34 within the cab of the vehicle 20. A lid 46 is rotatably attached to the forward roof section 44. In a stowed configuration, the lid 46 is in a closed position with the lid 46, whereby the lid 46 is in an aerodynamic configuration with the other roof sections 44 and 48. In other words, when in the aerodynamic configuration, a top surface of the lid 46 is substantially flush with the top surfaces of the roof sections 44 and 48 and the glass roof 42.

In various embodiments, a recreational device mount 38 is attached to a base surface 36 of the cavity 34. The recreational device mount 38 includes a front fork latching mechanism for securely attaching to dropouts of a fork 50 of a recreational device. It will be appreciated that the recreational device may be a bicycle, a tricycle, or other vehicles having wheel mounting forks with dropouts or comparable attachment mechanisms.

In various embodiments, the lid 46 is rotatably attached to the forward roof section 44. The attachment mechanism may include a biased hinge. In various embodiments and given by way of example only and not limitation, the biased hinge may be a spring or comparable device. The biased hinged may be selected to apply a closing force to the lid 46 (FIG. 2). When the fork 50 is attached to the recreational device mount 38, a closing force applies a force between the lid 46 and the fork 50 of the recreational device (FIG. 3).

In various embodiments, the lid 46 may include a foam piece for making soft contact with the recreational device fork 50. The lid 46 provides a protective shield to a portion of the recreational device fork 50. It will be appreciated that without a biased hinge, air pressure caused by motion of the vehicle 20 may be enough to keep the lid 46 closed when in the closed configuration and adhered to the fork 50 when a fork 50 of a recreational device is mounted to the recreational device mount 38.

In various embodiments, the cavity of the forward mounting section 30 may include a drain. The drain may include any structure for allowing water to evacuate from the cavity 34, for example a trough leading to an outer edge of the surrounding roof section 48 or a hole at a low point leading to a drain, such as a sunroof drain.

It will be appreciated that other roof types or features may be located aft of the forward mounting section 30. For example, the roof types or features may include a stamped roof, a movable sunroof, or comparable roof designs.

Figure 4:
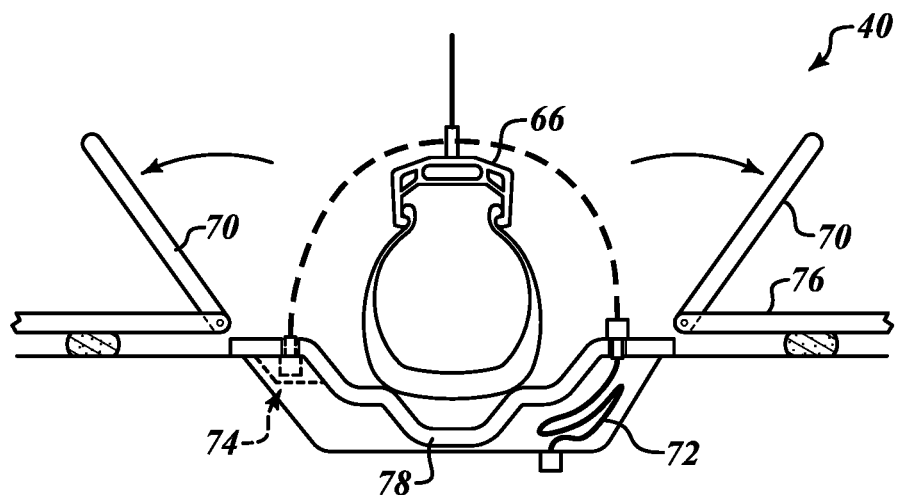
FIG. 4 is a cross-sectional view of another illustrative roof mounting system used on the vehicle of FIG. 1.
Figure 5:
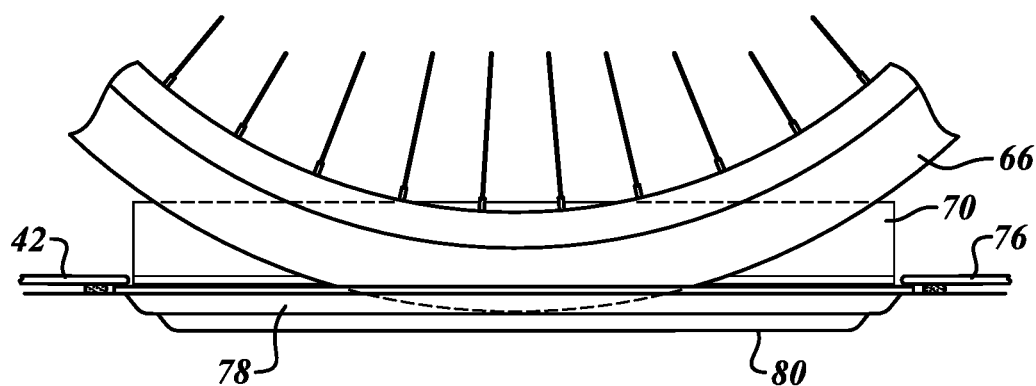
FIG. 5 is a cross-sectional view of the roof mounting system of FIG. 4.

Referring additionally to FIGS. 4 and 5, in various embodiments the aft mounting section 40 includes a cavity formed within a roof section 76 aft of the glass roof 42. A mounting bracket 78 is attached a base of the cavity. The mounting bracket 78 may be shaped to receive various widths of recreational device wheels, such as road bike wheels, mountain bike wheels, or the like. A first end of the mounting bracket 78 includes a slot for receiving a locking strap 72. A first end of the locking strap 72 may be attached to the base of the cavity or may include a knob too big to pass through the slot. A second end of the mounting bracket 78 includes a locking feature 74. The locking feature 74 may frictionally receive a second end of the locking strap 72 under tension. Once a wheel 66 of a recreational device is placed on the mounting bracket 78, the locking strap 72 is drawn over the top of an inner edge of the wheel 66 between spokes, then attached to the locking feature 74.

In various embodiments, the aft mounting section 40 may include left and right lids 70. The lids 70 rotatably attached to the roof section 76 at sides of the cavity of the aft mounting section 40. The lids 70 rotate about an axis approximately parallel to a longitudinal axis of the vehicle 20. It will be appreciated that a biased hinge may use to rotatably attach the lids 70 to the roof section 76. The biased hinge may apply a closing force to the lids 70.

In various embodiments, the cavity of the aft mounting sections 40 may include a drain similar to that described above for the forward mounting sections 30.

Figure 6:
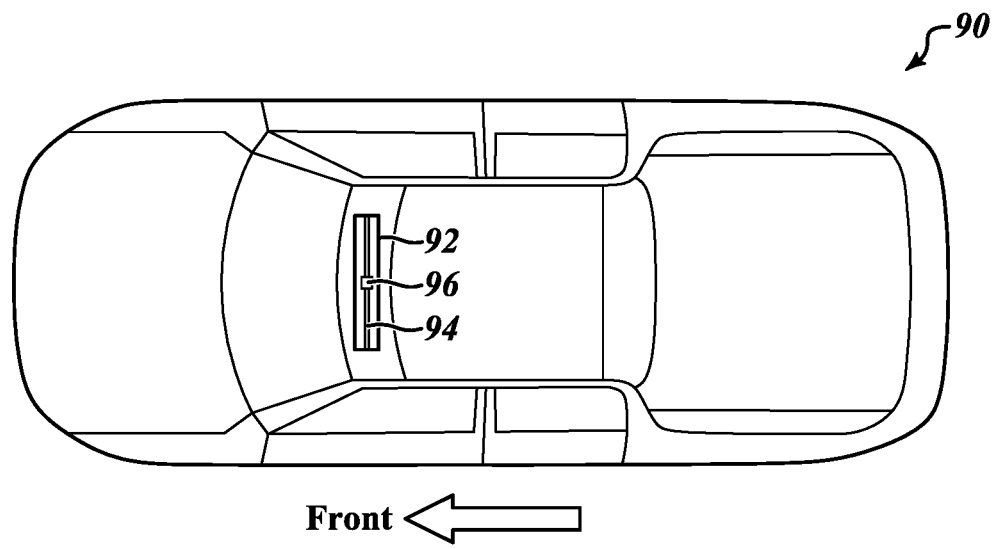
FIG. 6 is a top plan view of an illustrative vehicle.

In various embodiments, a vehicle 90 (FIG. 6) includes a recreational device mount 96 that may be removably attachable to a lateral mounting bar 94. The mounting bar 94 would be attached within a recessed forward mounting section 92 of a roof of a cab of the vehicle 90. The recessed forward mounting section 92 spans much or all of the width of a vehicle roof. The recreational device mount 96 may be positioned at predefined positions or any of position along the mounting bar 94. This configuration allows the user to select where to mount a recreational device laterally on the roof. Also, the mounting bar 94 would be capable of receiving multiple recreational device mounts 96, thereby enabling one to attach multiple recreational devices to the vehicle 90.

From the foregoing discussion and associated drawing figures, it will be appreciated that various embodiments have been disclosed and illustrated. To that end and without any implication of any limitation (which is not to be inferred), the following paragraphs set forth non-limiting summaries of various embodiments disclosed herein by way of example only and not of limitation:

A. A vehicle roof comprising: a rooftop; and a forward recess section disposed near a forward end of the rooftop, the forward recess section defining a first cavity, the forward recess section including: a recreational device mount disposed within the first cavity; and a lid configured to aerodynamically cover the first cavity.

B. The vehicle roof of A, wherein the lid is rotatable between a stowed position and a recreational device loaded position.

C. The vehicle roof of B, wherein a top surface of the lid is substantially flush with a top surface of portions of the rooftop surrounding the first cavity.

D. The vehicle roof of C, wherein the lid further includes a hinge configured to attach to a portion of the forward recess section disposed at a forward edge of the first cavity and a forward end of the lid.

E. The vehicle roof of D, wherein the hinge includes a biasing mechanism configured to apply a rotational force on the lid towards the stowed position.

F. The vehicle roof of E, wherein the biasing mechanism includes a spring.

G. The vehicle roof of A, wherein the forward recess section includes a drain.

H. The vehicle roof of B, wherein the lid is configured to provide protection to at least a portion of a recreational device mounted to the recreational device mount.

The vehicle roof of A, wherein the recreational device mount includes a mount for a front fork of a bicycle.

J. The vehicle roof of A, further comprising: an aft recess section disposed near an aft end of the rooftop, the aft recess section defining a second cavity, the aft recess section including: a base mounting bar attached to a bottom surface of the second cavity, the base mounting bar being configured to receive a wheel of a recreational device; a mounting strap configured to be detachable from a first side of the base mounting bar and to be slidably received within a second side of the base mounting bar; and a lid rotatably attachable to the rooftop at a side of the aft recess section, the lid being configured to aerodynamically cover the second cavity.

K. A vehicle comprising: a cab; a roof configured to cover the cab; a forward recess section disposed near a forward end of the rooftop, the forward recess section defining a first cavity, the forward recess section including: a recreational device mount disposed within the first cavity; and a lid configured to aerodynamically cover the first cavity.

L. The vehicle of K, wherein the lid is rotatable between a stowed position and a recreational device loaded position, the lid further including a hinge configured to attach to a portion of the rooftop disposed at a forward edge of the forward recess section and a forward end of the lid.

M. The vehicle of L, wherein the hinge includes a biasing mechanism configured to apply a force on the lid to maintain the stowed position.

N. The vehicle of M, wherein the biasing mechanism includes a spring.

O. The vehicle of K, wherein the recreational device mount includes a mount for a front fork of a bicycle.

P. The vehicle of K, further comprising: an aft recess section disposed near an aft end of the roof, the aft recess section defining a second cavity, the aft recess section including: a base mounting bar attached to a bottom surface of the second cavity, the base mounting bar being configured to receive a wheel of a recreational device; a mounting strap configured to be detachable from a first side of the base mounting bar and to be slidably received within a second side of the base mounting bar; and a lid rotatably attachable to the rooftop at a side of the aft recess section, the lid being configured to aerodynamically cover the second cavity.

Q. A bicycle carrier comprising: a recess roof section disposed at a forward section of a rooftop, the recess roof section defining a cavity; a lid configured to aerodynamically cover the recess roof section; and a front fork mount disposed within the recess roof section.

R. The bicycle carrier of Q, wherein the lid is rotatable between a stowed position and a recreational device loaded position.

S. The bicycle carrier of R, wherein a top surface of the lid is configured to be substantially flush with a top surface of portions of a vehicle rooftop surrounding the recess roof section.

T. The bicycle carrier of S, further comprising a hinge configured to attach to a portion of the recess roof section disposed at a forward edge of the cavity and a forward end of the lid.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A vehicle roof comprising:
   a rooftop; and
   a forward recess section disposed near a forward end of the rooftop, the forward recess section defining a first cavity, the forward recess section including:
   a recreational device mount disposed within the first cavity; and
   a lid configured to aerodynamically cover the first cavity, wherein the lid is rotatable between a stowed position and a recreational device loaded position.

2. The vehicle roof of claim 1, wherein a top surface of the lid is substantially flush with a top surface of portions of the rooftop surrounding the first cavity.

3. The vehicle roof of claim 2, wherein the lid further includes a hinge configured to attach to a portion of the forward recess section disposed at a forward edge of the first cavity and a forward end of the lid.

4. The vehicle roof of claim 3, wherein the hinge includes a biasing mechanism configured to apply a rotational force on the lid towards the stowed position.

5. The vehicle roof of claim 4, wherein the biasing mechanism includes a spring.

6. The vehicle roof of claim 1, wherein the lid is configured to provide protection to at least a portion of a recreational device mounted to the recreational device mount.

7. The vehicle roof of claim 1, wherein the recreational device mount includes a mount for a front fork of a bicycle.

8. The vehicle roof of claim 1, further comprising:
   an aft recess section disposed near an aft end of the rooftop, the aft recess section defining a second cavity, the aft recess section including:
   a base mounting bar attached to a bottom surface of the second cavity, the base mounting bar being configured to receive a wheel of a recreational device;
   a mounting strap configured to be detachable from a first side of the base mounting bar and to be slidably received within a second side of the base mounting bar; and a lid rotatably attachable to the rooftop at a side of the aft recess section, the lid being configured to aerodynamically cover the second cavity.

9. A vehicle comprising:
a cab;
a roof configured to cover the cab;
a forward recess section disposed near a forward end of the rooftop, the forward recess section defining a first cavity, the forward recess section including:
a recreational device mount disposed within the first cavity; and
a lid configured to aerodynamically cover the first cavity, wherein the lid is rotatable between a stowed position and a recreational device loaded position.

10. The vehicle of claim 9, wherein the lid further includes a hinge configured to attach to a portion of the rooftop disposed at a forward edge of the forward recess section and a forward end of the lid.

11. The vehicle of claim 10, wherein the hinge includes a biasing mechanism configured to apply a force on the lid to maintain the stowed position.

12. The vehicle of claim 11, wherein the biasing mechanism includes a spring.

13. The vehicle of claim 9, wherein the recreational device mount includes a mount for a front fork of a bicycle.

14. The vehicle of claim 9, further comprising:
an aft recess section disposed near an aft end of the roof, the aft recess section defining a second cavity, the aft recess section including:

a base mounting bar attached to a bottom surface of the second cavity, the base mounting bar being configured to receive a wheel of a recreational device;
a mounting strap configured to be detachable from a first side of the base mounting bar and to be slidably received within a second side of the base mounting bar; and
a lid rotatably attachable to the rooftop at a side of the aft recess section, the lid being configured to aerodynamically cover the second cavity.

15. A bicycle carrier comprising:
a recess roof section disposed at a forward section of a rooftop, the recess roof section defining a cavity;
a lid configured to aerodynamically cover the recess roof section, wherein the lid is rotatable between a stowed position and a recreational device loaded position; and
a front fork mount disposed within the recess roof section.

16. The bicycle carrier of claim 15, wherein a top surface of the lid is configured to be substantially flush with a top surface of portions of a vehicle rooftop surrounding the recess roof section.

17. The bicycle carrier of claim 16, further comprising a hinge configured to attach to a portion of the recess roof section disposed at a forward edge of the cavity and a forward end of the lid.

* * * * *